(12) United States Patent
Davis et al.

(10) Patent No.: US 9,438,716 B2
(45) Date of Patent: Sep. 6, 2016

(54) ACTIVITY INDICATOR

(71) Applicant: Plantronics, Inc., Santa Cruz, CA (US)

(72) Inventors: Jennifer Davis, Aptos, CA (US); Ken Comstock, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 102 days.

(21) Appl. No.: 13/945,698

(22) Filed: Jul. 18, 2013

(65) Prior Publication Data

US 2015/0024804 A1 Jan. 22, 2015

(51) Int. Cl.
*H04M 1/60* (2006.01)
*H04M 1/725* (2006.01)

(52) U.S. Cl.
CPC ....... *H04M 1/6066* (2013.01); *H04M 1/72544* (2013.01); *H04M 1/72569* (2013.01)

(58) Field of Classification Search
CPC ........... H04M 1/6058; H04M 1/7253; H04M 1/72519
USPC ................ 455/569.1, 575.2, 41.1, 41.2, 41.3
See application file for complete search history.

(56) References Cited

U.S. PATENT DOCUMENTS

| | | |
|---|---|---|
| 5,210,791 A | 5/1993 | Krasik |
| 5,359,647 A | 10/1994 | Regen et al. |
| 7,359,525 B1 | 4/2008 | Bobisuthi |
| 8,209,441 B1 | 6/2012 | Brockway et al. |
| 9,042,815 B2 * | 5/2015 | Rizkallah et al. ........... 455/41.1 |
| 2005/0266891 A1 * | 12/2005 | Mullen .......................... 455/567 |
| 2006/0135218 A1 * | 6/2006 | Son ....................... H04B 1/3877 455/573 |
| 2008/0205664 A1 * | 8/2008 | Kim .................... H04M 1/6066 381/77 |
| 2008/0220718 A1 * | 9/2008 | Sakamoto et al. ........... 455/41.2 |
| 2008/0260169 A1 * | 10/2008 | Reuss ...................... H04R 1/10 381/58 |
| 2009/0163141 A1 * | 6/2009 | Chae ............................ 455/41.3 |
| 2009/0264161 A1 * | 10/2009 | Usher et al. .................. 455/570 |
| 2010/0115149 A1 | 5/2010 | Ewer |
| 2011/0045813 A1 * | 2/2011 | Choi ............................. 455/418 |
| 2011/0154700 A1 * | 6/2011 | Ioakimidis ...................... 40/541 |
| 2012/0306642 A1 * | 12/2012 | Howard ................. A42B 3/046 340/539.11 |
| 2013/0225127 A1 * | 8/2013 | Cavacuiti et al. ............. 455/411 |
| 2015/0011259 A1 * | 1/2015 | Chirde .......................... 455/557 |

OTHER PUBLICATIONS

Kuando Busylight, Plenom a/s, pp. 1-7, Oct. 2011.*

* cited by examiner

*Primary Examiner* — Nguyen Vo

(74) *Attorney, Agent, or Firm* — Chuang Intellectual Property Law

(57) ABSTRACT

Methods and apparatuses for activity indication are disclosed. In one example, an activity indicator apparatus includes a housing, a visual indicator visible on a housing surface, and a power source. The apparatus includes a wireless communications interface configured to receive a signal indicating an activity of a user device, and an activity indication application configured to indicate the activity at the visual indicator.

14 Claims, 10 Drawing Sheets

ACTIVITY INDICATOR

BACKGROUND OF THE INVENTION

The use of headsets in both the office and mobile environments has become commonplace. One problem with headset telephones, however, is that passers-by may be unaware that the user of a headset telephone is carrying on a conversation, and may therefore not afford the headset user the same deference as when a telephone user is holding a telephone handset to his or her ear. On the other hand, passers-by who notice that a headset user is wearing a headset may incorrectly assume that the user is carrying on a telephone conversation, possibly causing the passers-by to take unnecessary steps such as speaking in hushed tones or foregoing face-to-face conversations with the headset wearer, in order to avoid interrupting the non-existent telephone conversation.

Furthermore, headsets are not only used with telephony systems but are widely used in a variety of computer and other multimedia applications, particularly with the convergence of computer and telephony technologies. Examples of headsets designed to connect to computers or other processor-based hosts include those adapted for various applications such as computer telephony (generally referred to as softphones), voice recognition, language or speech learning, audio listening for music, training, video, etc., and/or video game systems. Headsets can be used with softphones, landline telephones, and mobile telephones.

In order to prevent interruptions of phone conversations when a headset is in use it is desirable to have some sort of visual indication that the headset wearer is actively engaged in a phone conversation. With handsets this is intrinsically obvious but headsets may be worn whether or not the user is actually engaged in a telephone call. In the prior art, there have been devices for indicating to onlookers that a user is on a telephone call and should not be disturbed or interrupted. However, in the prior art, devices for indicating headset activity have had only limited applications and limited operational flexibility.

As a result, improved methods and apparatuses for indicating device activity are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
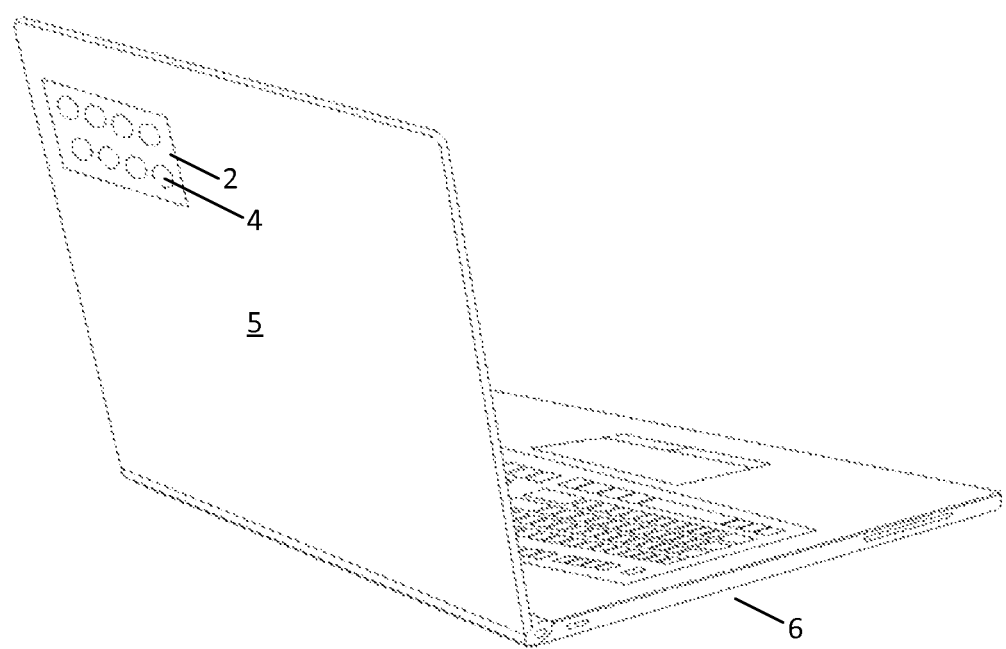
FIG. 1 illustrates an activity indicator in one example.

Methods and apparatuses for activity indication are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, an activity indicator apparatus includes a housing, a visual indicator visible on a housing surface, and a power source. The apparatus includes a wireless communications interface configured to receive a signal indicating an activity of a user device, and an activity application configured to indicate the activity at the visual indicator.

In one example, an activity indicator apparatus includes a housing having a first surface and a second surface, a plurality of light emitting diodes visible on the second surface, and a power source. The apparatus includes a wireless communications interface configured to receive a signal indicating an activity and a processor. The apparatus further includes a memory comprising an activity indication application configured to indicate the activity at the plurality of light emitting diodes responsive to the signal received on the wireless communications interface.

In one example, an activity indicator apparatus includes a housing including a substantially planar form factor including a top planar surface and a bottom planar surface. The apparatus includes an adhesive material attached to the bottom planar surface, where the adhesive material is arranged to enable attachment of the housing to a desired object. The apparatus further includes a plurality of light emitting diodes visible on the second surface, a battery, a wireless communications interface configured to receive a signal indicating an activity of a user device, and a processor. The apparatus further includes a memory including an activity indication application configured to indicate the activity at the plurality of light emitting diodes responsive to the signal received on the wireless communications interface.

In one example, one or more non-transitory computer-readable storage media have computer-executable instructions stored thereon which, when executed by one or more computers, cause the one more computers to perform operations including detecting a usage activity of a headset. The operations include wirelessly transmitting a notification of the usage activity to an activity indicator device attached to an object, and indicating the usage activity at the activity indicator device.

In one example, a method includes detecting a usage activity of an electronic device and wirelessly transmitting a notification of the usage activity to an activity indicator device attached to an object. The method includes indicating the usage activity at the activity indicator device.

In one example, one or more non-transitory computer-readable storage media have computer-executable instructions stored thereon which, when executed by one or more computers, cause the one more computers to perform operations including detecting a usage activity of a headset and determining whether the usage activity is a listen only usage activity type or a listen and talk usage activity type. The operations include wirelessly transmitting a notification of the usage activity indicating either the listen only usage activity type or the listen and talk usage activity type to an activity indicator device attached to an object. The operations further include indicating the listen only usage activity type or the listen and talk usage activity type at the activity indicator device.

In one example, a method includes receiving at an activity indicator device a notification of a headset usage activity indicating either a listen only usage activity type or the listen and talk usage activity type. The method further includes indicating the listen only usage activity type at a first LED group at the activity indicator device or the listen and talk usage activity type at a second LED group at the activity indicator device.

In one example, a Bluetooth device in the form of a "sticker" attachable to a variety of objects provides information on headset activity. The Bluetooth sticker visually indicates if the user is on a call, streaming audio or available. The user may be on a call using a softphone, hardphone, or mobile phone. The Bluetooth sticker utilizes the Bluetooth Low Energy (BLE) protocol of Bluetooth 4.0. The Bluetooth sticker has a user interface button to engage pairing mode and will pair to the native Bluetooth stack at a computing device which provides information to the Bluetooth sticker on headset activity. The computing device sends information to the Bluetooth sticker which indicates if the user is on a call, streaming audio or available using softphones, hardphones, and mobile phones for sourcing this information. This information is gathered for all audio devices and sent to the Bluetooth sticker via the onboard, native Bluetooth stack. The appearance of the Bluetooth sticker changes based upon the information it receives from the host computing device. The Bluetooth sticker indicates if the user is actively engaged in a call (mobile, hardphone, softphone), simply streaming audio, or neither and therefore available.

In one example implementation, the Bluetooth sticker is powered by either a rechargeable coin battery, or a long lasting replaceable coin battery. In a further example, solar cells may be used. In one example, the Bluetooth sticker is approximately 2.5 inches wide and 3 inches long, and desirably less than approximately 0.20 inches thick to maintain a "sticker" form factor. In one example, the Bluetooth sticker utilizes an adhesive which offers firm holding power, but allows for clean, damage free removal. In one example operation, light emitting diodes (LEDs) at the Bluetooth sticker emit light following a repeating headset pattern to indicate the user is on a call. These same LED's would become static and flash when the user places themselves on mute. Another group of LEDs emit light following a repeating treble cleft pattern to indicate the user is streaming audio.

In various examples, the Bluetooth sticker is configured to indicate that a PC user, desk phone user, mobile phone user, tablet user, or console game player is engaged in an active softphone call, listening to audio while playing a game, or listening to audio while playing or streaming music or video. The Bluetooth sticker may include a user interface mechanism, either at the sticker or at the host computing device, allowing the user to indicate the user does not wish to be disturbed, regardless of whether the headset is being worn. In this manner, the user may manually indicate via the user interface mechanism that the user is engaged in a priority activity and does not want to be interrupted. In a further example, the Bluetooth sticker provides battery/charge state information or other information associated with the Bluetooth sticker to the host computing device, which in turn may communicate this information to a server. The Bluetooth sticker may include environmental sensors that communicate state information to the host computing device. In one example, a computing device application may poll the Bluetooth sticker for status information, such as if the Bluetooth sticker is displaying an indication, what is being displayed, and the Bluetooth sticker battery level.

FIG. 1 illustrates an activity indicator 2 in one example. In the example shown in FIG. 1, activity indicator 2 includes a housing having a plurality of light emitting diodes (LEDs) 4 visible on a top planar surface of the housing. Activity indicator 2 is operable to receive a signal indicating an activity and indicate the activity at the plurality of light emitting diodes 4 responsive to the signal. For example, the signal indicating the activity may be received from a computing device 6 via wireless communications. In one example, the activity is related to use of a headset with computing device 6. In one example, the bottom surface of the housing of the activity indicator 2 includes an adhesive material operable to attach the activity indicator 2 to a desired object.

In the example shown in FIG. 1, activity indicator 2 is attached (e.g., using the adhesive) to a top surface 5 of notebook computing device 6. Such placement of the activity indicator 2 is particularly advantageous when the activity indicated is related to use of a headset with computing device 6 and the user is seated in a position in front of the computing device 6 viewing the device display screen. This is a typical usage scenario whereby a person wishing to communicate with the headset user approaches the headset user and sees the top surface 5 of computing device 6 and the user sitting behind the computing device 6 wearing a headset. The person wishing to communicate with the headset user does not see the display screen of the computing device 6 and therefore cannot see what activity the user is engaged in at the computing device 6. The activity indicator 2 attached to the top surface 5 is thus ideally positioned to indicate to the person approaching the activity of the headset user.

Furthermore, in the example where activity indicator 2 receives activity signals from computing device 6, this position ensures that activity indicator 2 is always within wireless communication range of computing device 6 (i.e., the device transmitting the activity signal). Furthermore, the close proximity between activity indicator 2 and computing device 6 allows for the use of a very low power requirement wireless transmission protocol between activity indicator 2 and computing device 6, such as the Bluetooth Low Energy (BLE) protocol. In further examples, activity indicator 2 may be attached to different objects, such as the back side of a desktop LCD monitor.

Figure 2:
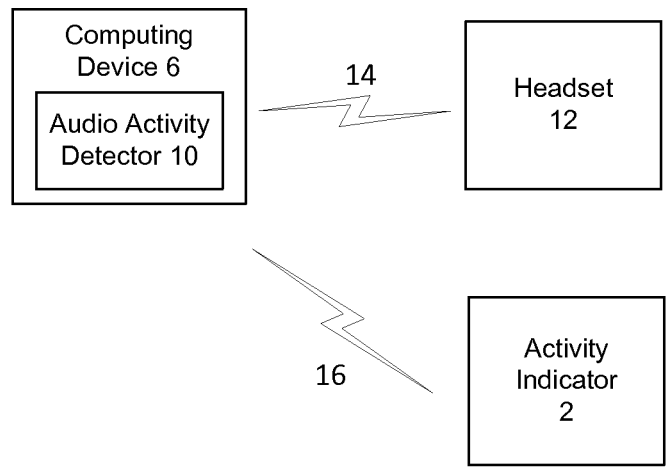
FIG. 2 illustrates a system for activity indication in one example.

FIG. 2 illustrates a system for activity indication in one example. The system includes a computing device 6 having an audio activity detector 10, a headset 12, and an activity indicator 2. Headset 12 is in communication with computing device 6 via a wireless communications link 14. Activity indicator 2 is in communication with computing device 6 via a wireless communications link 16.

In one example, audio activity detector 10 detects a usage activity of the headset 12. For example, detecting the usage activity of the headset 12 includes detecting a telephony usage or detecting a music listening usage of headset 12 with an application at computing device 6.

Audio activity detector 10 transmits over wireless communications link 16 a notification of the usage activity to the activity indicator 2 attached to an object. Responsive to the notification, activity indicator 2 indicates the usage activity. In one example, indicating the usage activity at the activity indicator 2 includes activating one or more visual indicators (e.g., LEDs 4) on the activity indicator 2 which allows observers around the headset user to quickly and easily tell not only that the user is online (i.e., actively using the headset) in some manner, but the type of online activity as well. In further examples, the visual indicators may be, without limitation, an LCD, ePaper, or organic light emitting diodes (OLEDs).

In one example, activity indicator 2 receives a notification of a headset 12 usage activity indicating either a listen only usage activity type (e.g., music listening) or a listen and talk usage activity type (e.g., conducting a voice communications telephony call). Activity indicator 2 indicates the listen only usage activity type at a first group of LEDs 4 at the activity indicator 2 or the listen and talk usage activity type at a second group of LEDs 4 at the activity indicator 2.

Figure 3:
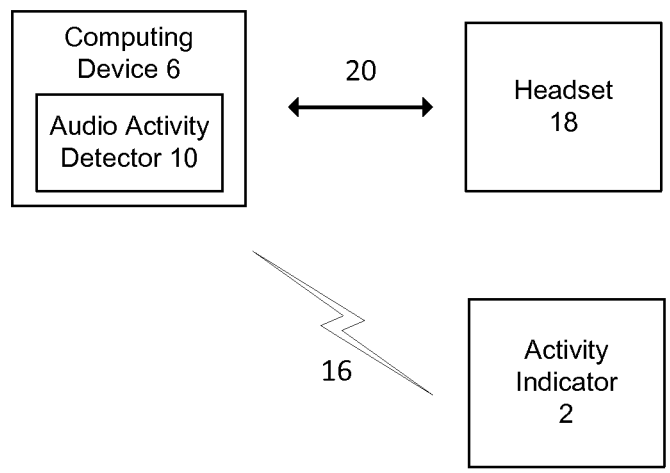
FIG. 3 illustrates a system for activity indication in one example.

FIG. 3 illustrates a system for activity indication in a further example. The system shown in FIG. 3 is substantially similar to the system shown in FIG. 2 except that wireless communications link 14 has been replaced with a wired communications link 20 between computing device 6 and a headset 18. For example, headset 18 may couple to computing device 6 via a cable at a Universal Serial Bus (USB) port at computing device 6. In one example, audio activity detector 10 detects whether a microphone channel on the USB port is active to determine whether the user is engaged in a listen and talk telephony usage or a music listening usage of headset 18.

Figure 4:
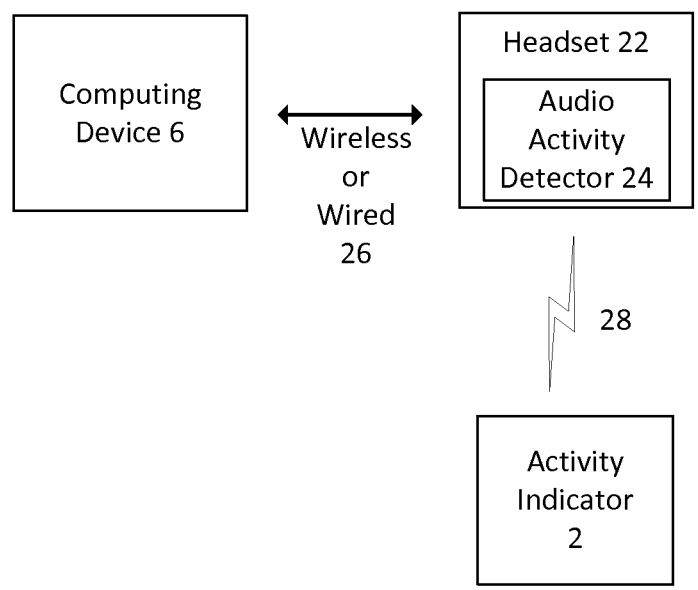
FIG. 4 illustrates a system for activity indication in one example.

FIG. 4 illustrates a system for activity indication in a further example. The system includes a computing device 6, a headset 22 having an audio activity detector 24, and an activity indicator 2. Headset 22 is in communication with computing device 6 via a wireless or wired communications link 26. Activity indicator 2 is in communication with headset 22 via a wireless communications link 28.

In one example, audio activity detector 24 detects a usage activity of the headset 22. For example, detecting the usage activity of the headset 22 includes detecting a telephony usage or detecting a music listening usage of headset 22 with an application at computing device 6. In one example, audio activity detector 24 monitors activity of the headset 22 microphone (i.e., it is transmitting an audio signal) to determine whether the user is engaged in a listen and talk telephony usage or a music listening usage of headset 22.

Audio activity detector 24 transmits over wireless communications link 28 a notification of the usage activity to the activity indicator 2 attached to an object. Responsive to the notification, activity indicator 2 indicates the usage activity. In one example, indicating the usage activity at the activity indicator 2 includes activating one or more visual indicators (e.g., LEDs 4) on the activity indicator 2.

Figure 5:
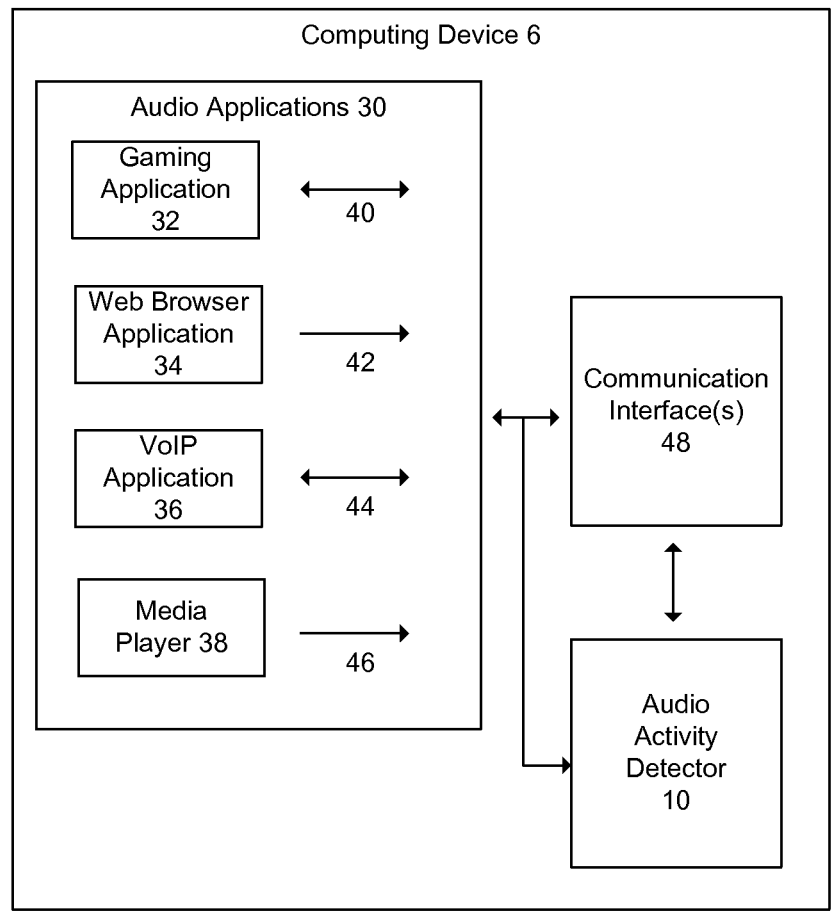
FIG. 5 illustrates an example of the computing device shown in FIG. 2 or FIG. 3.

FIG. 5 illustrates an example of the computing device 6 shown in FIG. 2 or FIG. 3. Computing device 6 includes a variety of audio applications 30. As used herein, the term "audio application" includes any application which outputs and/or receives audio. For example, audio applications 30 include without limitation a gaming application 32 having bi-directional audio 40 (including both listen and talk audio), web browser application 34 outputting audio 42, VoIP application 36 having bi-directional audio 44 (including both listen and talk audio corresponding to voice communications between a near end conversation participant and a remote conversation participant), and media player 38 outputting audio 46 (e.g., music). Furthermore, in certain usages an audio application may only output audio, only receive audio, or both output audio and receive audio.

Audio data is output from computing device 6 and received at computing device 6 via communication interface(s) 48, which may include network interfaces, wired communication interfaces, and wireless communication interfaces. In one example, audio activity detector 10 is configured to detect whether a headset is being used with an audio application 30 and configured to determine whether the usage is a listen only audio application (e.g., media player 38), or a listen and talk audio application (e.g., VoIP application 36). For example, audio activity detector 10 may monitor communication interface(s) 48 to determine whether audio is being transmitted to the headset only, or whether audio is being both transmitted to the headset and received from the headset. In a further example, audio activity detector 10 utilizes an application programming interface (API) to identify and monitor usage of each audio application 30.

Figure 6:
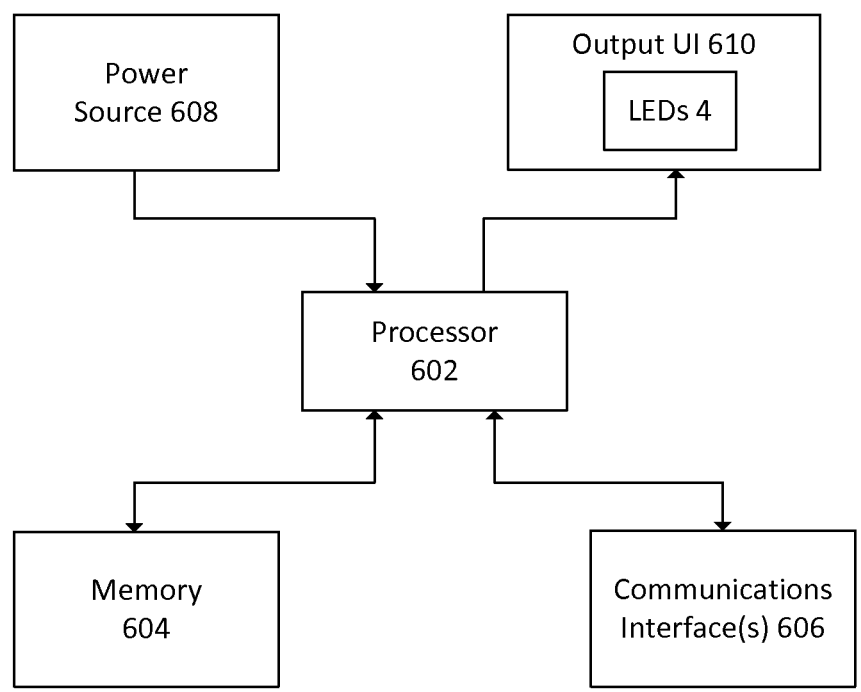
FIG. 6 illustrates a simplified block diagram of the activity indicator shown in FIGS. 1-4 in one example.

FIG. 6 illustrates a simplified block diagram of the activity indicator 2 shown in FIGS. 1-4 in one example configured to implement one or more of the examples described herein. In one example, an activity indicator 2 includes a processor 602, memory 604, communications interface(s) 606, power source 608, and output user interface 610. Output user interface 610 includes LEDs 4. In one example, the communication interface(s) 606 is a wireless transceiver.

In one example, the user interface of activity indicator 2 is desirably limited so that the form factor size, processing power requirements, and power requirements can be minimized. In a further example, a user interface may include various means to receive user input actions, such as a power-on button.

Memory 604 represents an article that is computer readable. For example, memory 604 may be any one or more of the following: random access memory (RAM), read only memory (ROM), flash memory, or any other type of article that includes a medium readable by processor 602. Memory 604 can store computer readable instructions for performing the execution of the various method embodiments of the present invention. In one example, the processor executable computer readable instructions are configured to perform part or all of a process such as that shown in FIGS. 8-10.

Computer readable instructions may be loaded in memory 604 for execution by processor 602.

Communication interface(s) 606 allow activity indicator 2 to communicate with other devices. In one particularly advantageous example, communication interface(s) 606 is a Bluetooth subsystem utilizing the Bluetooth Low Energy (BLE) profile. In this manner, the power requirement of activity indicator 2 is kept to a minimum, allowing for a smaller power source 608 (e.g., a smaller battery).

In further examples, communication interface(s) 606 may include, but are not limited to, a wireless transceiver, an integrated network interface, a radio frequency transmitter/receiver, a USB connection, or other interfaces for connecting activity indicator 2 to a telecommunications network such as a Bluetooth network, WiFi network, cellular network, or an IP network. Communication interface(s) 606 include any wireless communication interface, including one or more short-range wireless communication subsystems. The short-range communications subsystem may include an infrared device and associated circuit components for short-range communication, a near field communications (NFC) subsystem, a Bluetooth subsystem including a transceiver, or an IEEE 802.11 (WiFi) subsystem in various non-limiting examples.

In one example operation, the activity indicator 2 includes a processor 602 configured to execute one or more applications and operate the activity indicator 2 to receive a notification of a headset usage activity indicating either a listen only usage activity type or the listen and talk usage activity type. The activity indicator 2 indicates the listen only usage activity type at a first LED group or the listen and talk usage activity type at a second LED group, where the LEDs 4 are divided into the first LED group and the second LED group.

Figure 7A:
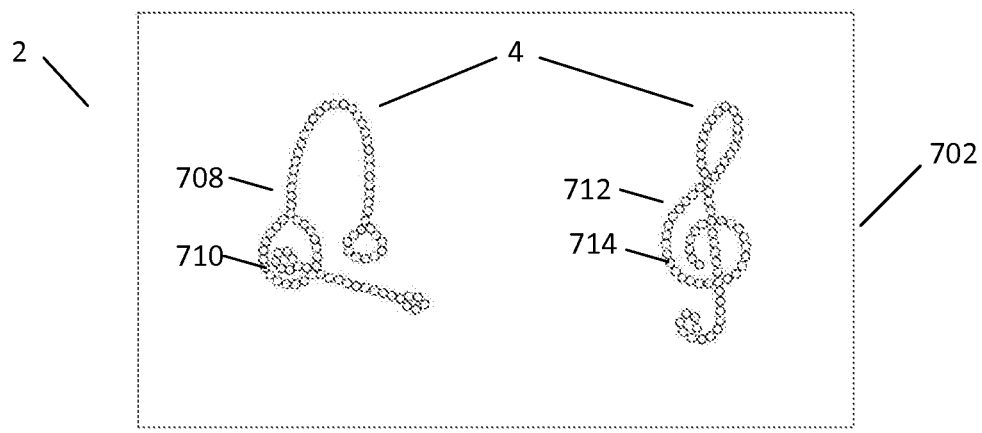
FIG. 7A illustrates a top view of an activity indicator in one example implementation of FIG. 6.

FIG. 7A illustrates a top view 702 of an activity indicator 2 in one example implementation of FIG. 6. Activity indicator 2 includes a housing having a top surface having a plurality of LEDs 4 visible on the surface. For example, the housing top surface may have a plurality of apertures so that LEDs 4 disposed under the surface are visible. In one example, the plurality of LEDs 4 include a first pattern 708 of light emitting diodes 710 to indicate a first activity and a second pattern 712 of light emitting diodes 714 to indicate a second activity. In the example shown in FIG. 7A, the first pattern 708 shows a headset having a microphone boom and the group of light emitting diodes 710 forming the headset pattern are dedicated (i.e., used only) to indicate that the user is engaged in a headset usage involving listening and talking.

The second pattern 712 shows a treble clef and the group of light emitting diodes 714 forming the treble clef are dedicated to indicate that the user is engaged in a listen only application. In one example, such indication may useful if the headset user has indicated a preference not to be interrupted while on a voice call, but wishes to be interrupted if he or she is only listening to music. The use of the activity indicator 2 to indicate the user is listening to music advantageously informs an observer that the user likely cannot hear the observer and the observer must therefore use more than just speech to get the user's attention and interrupt the user. In a further example, the first pattern 708 may use a first LED color and the second pattern 712 may use a second LED color to further indicate to an observer the availability of the user. For example, pattern 708 may utilize red LEDs in order to indicate unavailability and pattern 712 may utilize green LEDs to indicate availability.

In a further example, more than two patterns or groups of LEDs may be utilized on activity indicator to indicate other usage types. In a further example, the activity indicator 2 may have different graphical images printed on the housing surface to indicate different usage activity, where one or more LEDs are utilized to illuminate/indicate each printed image.

Figure 7B:
FIG. 7B illustrates a side view of the activity indicator shown in FIG. 7A.
Figure 7C:
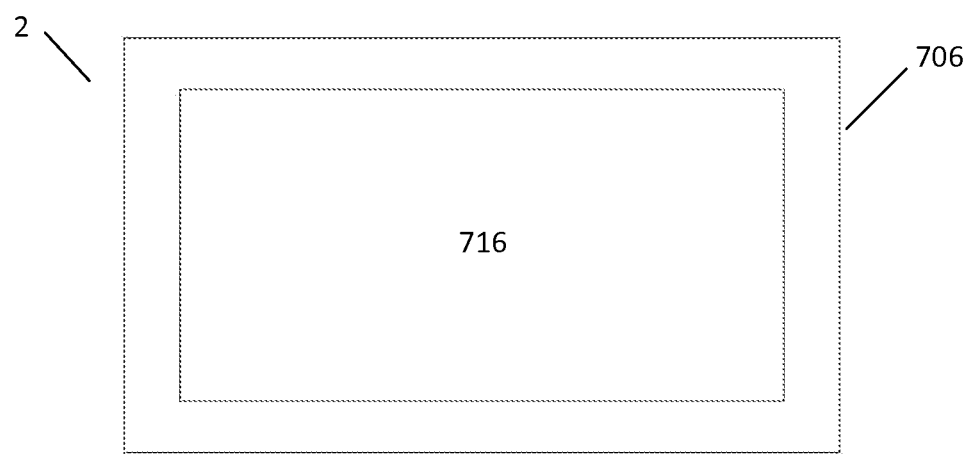
FIG. 7C illustrates a bottom view of the activity indicator shown in FIG. 7A.

FIG. 7B illustrates a side view 704 of the activity indicator 2 shown in FIG. 7A. FIG. 7C illustrates a bottom view 706 of the activity indicator 2 shown in FIG. 7A. In one example, the bottom surface of activity indicator 2 is configured to attach the housing to a desired object. For example, the bottom surface includes an adhesive material 716 operable to attach the activity indicator 2 to a desired object. In a further example, the bottom surface includes a clip type apparatus (e.g., a binder type clip) operable to attach the activity indicator 2 to a desired object.

In one example, the top surface and the bottom surface are substantially planar and the housing has a thickness of less than 0.2 inches. In this example, the activity indicator 2 can advantageously be attached to a variety of high visibility locations, which may be largely dependent on the user's work environment. Furthermore, by utilizing a planar form factor, it is possible to utilize patterns of LEDs as shown in FIG. 7A. This advantageously allows for use of graphical pattern layouts which can easily and quickly be deciphered by an observer as to a headset user's current activity, and also allows for indication of multiple variables.

Figure 8:
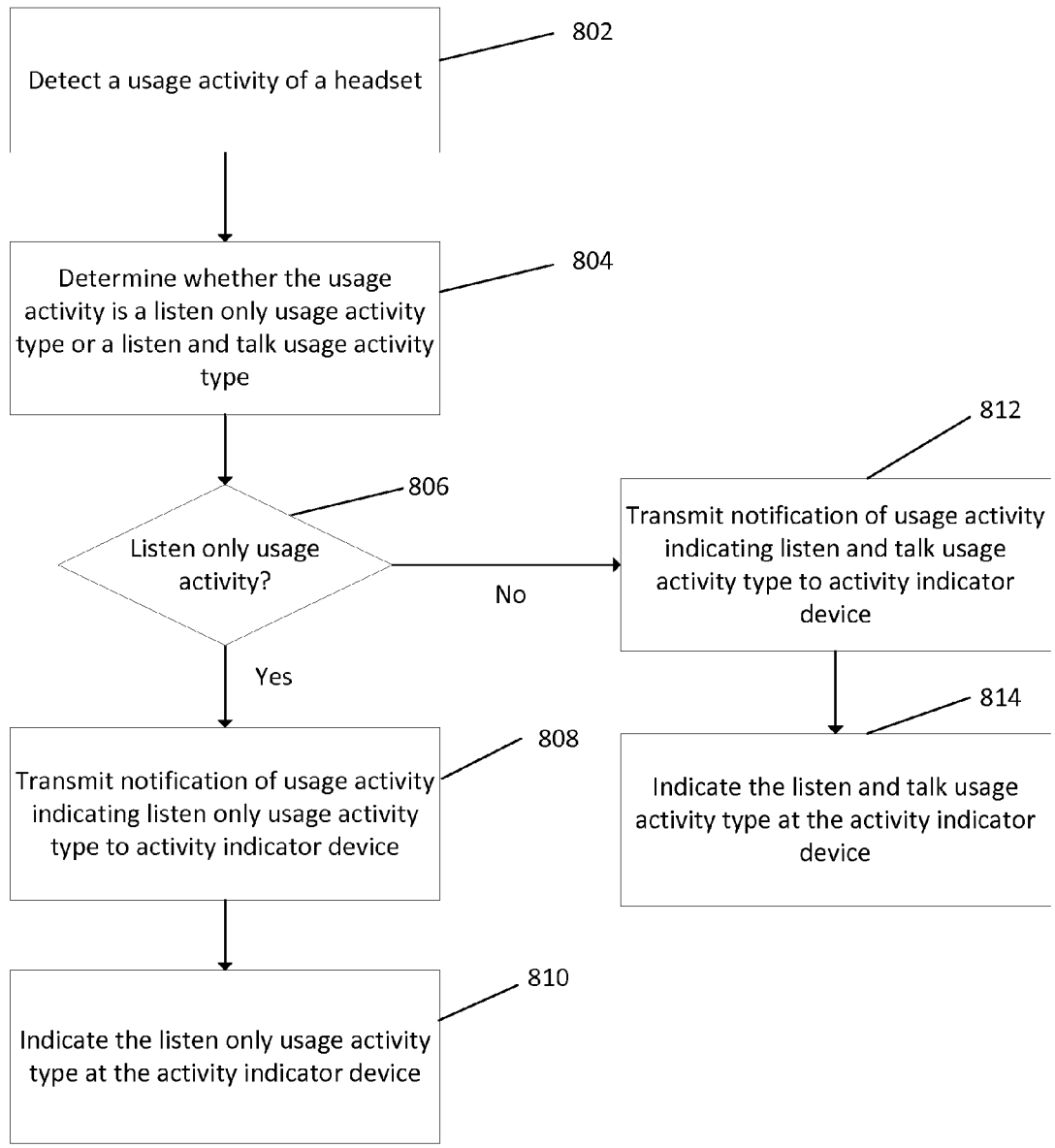
FIG. 8 is a flow diagram illustrating activity indication in one example.

FIG. 8 is a flow diagram illustrating activity indication in one example. At block 802, a usage activity of a headset is detected. At block 804, it is determined whether the usage activity is a listen only usage activity type or a listen and talk usage activity type.

At decision block 806, it is determined whether the activity is a listen only usage activity type. If yes at decision block 806, at block 808 a notification of usage activity is transmitted to the activity indicator device indicating a listen only usage activity type. At block 810, the activity indicator device indicates the listen only usage activity type.

If no at decision block 806, at block 812 a notification of usage activity is transmitted to the activity indicator device indicating a listen and talk usage activity type. At block 814, the activity indicator device indicates the listen and talk usage activity type.

Figure 9:
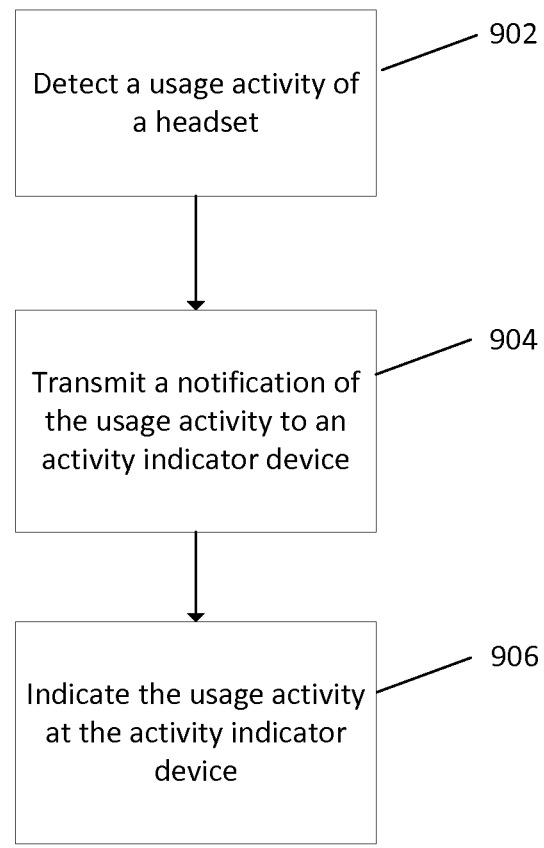
FIG. 9 is a flow diagram illustrating activity indication in one example.

FIG. 9 is a flow diagram illustrating activity indication in one example. At block 902, a usage activity of a headset is detected. In one example, detecting the usage activity of the headset includes detecting a telephony usage. In one example, detecting the usage activity of the headset includes detecting a music listening usage.

At block 904, a notification of the usage activity is transmitted to an activity indicator device. In one example, transmitting a notification of the usage activity to an activity indicator device includes wirelessly transmitting the notification from a computing device to the activity indicator device. For example, the computing device is in communication with the headset, the communication associated with the usage activity.

At block 906, the usage activity is indicated at the activity indicator device. In one example, indicating the usage activity at the activity indicator device includes activating one or more visual indicators on the activity indicator device. For example, the one or more visual indicators are a plurality of light emitting diodes visible on a planar surface of the activity indicator device.

Figure 10:
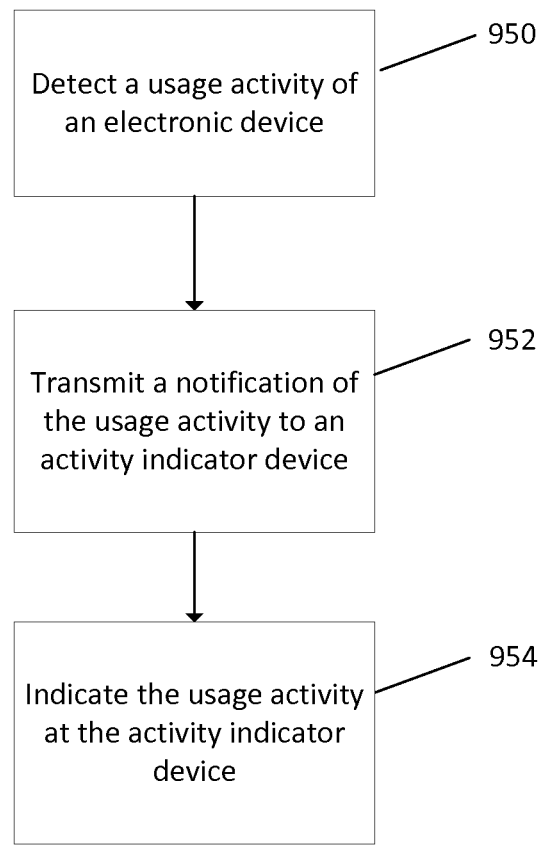
FIG. 10 is a flow diagram illustrating activity indication in one example.

FIG. 10 is a flow diagram illustrating activity indication in one example. At block 950, a usage activity of an electronic device is detected. In one example, the electronic device is a headset and the detecting the usage of the headset includes detecting whether a voice communications call is being conducted using the headset.

At block 952, a notification of the usage activity is transmitted to an activity indicator device. In one example, transmitting a notification of the usage activity to an activity indicator device includes wirelessly transmitting the notification from a computing device to the activity indicator device. In one example, the computing device is in communication with the electronic device, the communication associated with the usage activity. For example, the computing device may be a personal computer, notebook computer, tablet computer, smartphone, or game console computer.

At block 954, the usage activity is indicated at the activity indicator device. In one example, indicating the usage activity at the activity indicator device includes activating one or more visual indicators on the activity indicator device. For example, the one or more visual indicators are a plurality of light emitting diodes visible on a planar surface of the activity indicator device. In one example, the process further includes detecting a state data at the activity indicator device, and wireless transmitting the state data to the computing device. For example, the state data may be a battery status of the battery at the activity indicator device or sensor data from sensors at the activity indicator device.

Figure 11:
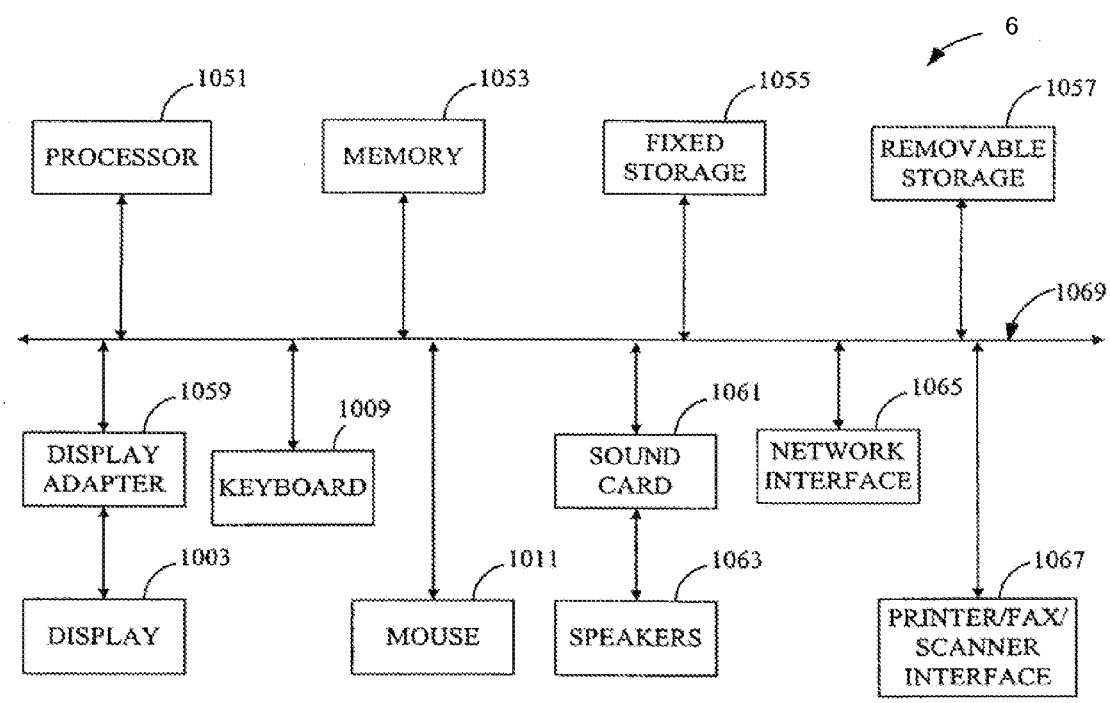
FIG. 11 illustrates a system block diagram of the computing device shown in FIG. 5.

FIG. 11 illustrates a block diagram of an exemplary computing device 6 suitable for executing software programs that implement the methods and processes described herein. The architecture and configuration of the computing device 6 shown and described herein are merely illustrative and other computer system architectures and configurations may also be utilized.

The exemplary computing device 6 includes a display 1003 having a display screen, a keyboard 1009, and a mouse 1011. A cabinet typically houses one or more drives to read a computer readable storage medium, a system memory 1053, and a hard drive 1055 which can be utilized to store and/or retrieve software programs incorporating computer codes that implement the methods and processes described herein and/or data for use with the software programs, for example. A CD and a floppy disk are exemplary computer readable storage media readable by a corresponding floppy disk or CD-ROM or CD-RW drive. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as optical disks, and specially configured hardware devices such as application-specific integrated circuits (ASICs), programmable logic devices (PLDs), and ROM and RAM devices.

The computing device 6 includes various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computing device 6 also includes a system bus 1069. However, the specific buses shown are merely illustrative of any interconnection scheme serving to link the various subsystems. For example, a local bus can be utilized to connect the central processor to the system memory and display adapter. Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. An activity indicator apparatus comprising:
   a housing comprising a housing first surface and a housing second surface, the housing first surface configured to attach to a display device second surface of a display device facing away from a user, the display device further comprising a display device first surface comprising a display screen facing the user in operation;
   a first light emitting device group visible on the housing second surface arranged to indicate a listen-only activity of a headset device and a second light emitting device group visible on the housing second surface arranged to indicate a headset telephony activity, the first light emitting device group distinct from and non-overlapping with the second light emitting device group;
   a power source;
   a wireless communications interface configured to receive from a computing device coupled to the housing one of either a first signal indicating the headset listen-only activity of a headset device or a second signal indicating the headset telephony activity of the headset device, wherein the computing device comprises the display device and the computing device is in communication with the headset;
   a processor; and
   a memory comprising an activity indication application configured to receive on the wireless communications interface from the computing device coupled to the housing either the first signal indicating the headset listen-only activity of the headset device or the second signal indicating the headset telephony activity of the headset device, and indicate the headset listen-only activity at the first light emitting device group responsive to the first signal and indicate the headset telephony activity at the second light emitting device group responsive to the second signal.

2. The activity indicator apparatus of claim 1, wherein the wireless communications interface utilizes a Bluetooth Low Energy (BLE) protocol.

3. The activity indicator apparatus of claim 1, wherein the housing first surface comprises an adhesive material operable to attach the activity indicator apparatus to the display device second surface.

4. The activity indicator apparatus of claim 1, wherein the housing first surface comprises a clip apparatus operable to attach the activity indicator apparatus to the display device second surface.

5. The activity indicator apparatus of claim 1, wherein the housing first surface and the housing second surface are substantially planar and the housing has a thickness of less than 0.2 inches.

6. One or more non-transitory computer-readable storage media having computer-executable instructions stored thereon which, when executed by one or more computers, cause the one more computers to perform operations comprising:
   detecting a usage activity of a headset with an application program executing on a computing device, the computing device comprising a display device comprising a display device first surface and a display device second surface, the display device first surface comprising a display screen facing a user and the display device second surface facing away from the user, wherein detecting the usage activity of the headset comprises determining whether the usage activity is a telephony usage or a music listening usage, wherein the computing device is in communication with the headset;
   wirelessly transmitting a notification of the usage activity of the headset to an activity indicator device attached to the display device second surface facing away from the user for indication of the usage activity at the activity indicator device, the usage activity comprising the telephony usage or music listening usage, wherein the activity indicator device comprises a first light emitting device group dedicated to indicating the telephony usage and a second light emitting device group dedicated to indicating the music listening usage, the first light emitting device group distinct from and non-overlapping with the second light emitting device group; and
   indicating the telephony usage at the first light emitting device group or the music listening usage at the second light emitting device group at the activity indicator device attached to the display device second surface facing away from the user.

7. The one or more non-transitory computer-readable storage media of claim 6, wherein indicating the usage activity at the activity indicator device comprises activating one or more visual indicators on the activity indicator device.

8. The one or more non-transitory computer-readable storage media of claim 7, wherein the one or more visual indicators are a plurality of light emitting diodes visible on a planar surface of the activity indicator device.

9. The one or more non-transitory computer-readable storage media of claim 6, wherein wirelessly transmitting the notification of the usage activity to the activity indicator device comprises wirelessly transmitting the notification from the computing device to the activity indicator device.

10. The one or more non-transitory computer-readable storage media of claim 6, wherein wirelessly transmitting the notification of the usage activity to the activity indicator device comprises wirelessly transmitting the notification from the headset to the activity indicator device.

11. A method comprising:
   determining whether a headset usage of a headset is a listen only usage activity type or a listen and talk usage activity type;
   wirelessly transmitting to an activity indicator device physically coupled to a computing device a notification of whether the headset usage of the headset is the listen only usage activity type or the listen and talk usage activity type, the notification for indication at the activity indicator device whether the headset usage is the listen only usage activity type or the listen and talk usage activity type, the computing device comprising a display device comprising a display device first surface and a display device second surface, the display device first surface comprising a display screen facing a user and the display device second surface facing away from the user, wherein the activity indicator device is attached to the display device second surface of the display device facing away from the user and comprises a first light emitting device group dedicated to indicating the listen and talk usage activity type and a second light emitting device group dedicated to indicating the listen only usage activity type, the first light emitting device group distinct from and non-overlapping with the second light emitting device group, wherein the computing device is in communication with the headset;
   receiving at the activity indicator device the notification whether the headset usage is the listen only usage activity type or the listen and talk usage activity type; and
   indicating the listen only usage activity type at the second light emitting device group or the listen and talk usage activity type at the first light emitting device group at the activity indicator device attached to the display device second surface facing away from the user.

12. The method of claim 11, wherein the first light emitting device group and the second light emitting device group are a plurality of light emitting diodes visible on a planar surface of the activity indicator device.

13. The method of claim 11, wherein receiving at the activity indicator device the notification of the headset usage comprises receiving the notification wirelessly from the computing device.

14. The method of claim 13, wherein the computing device comprises a personal computer, notebook computer, tablet computer, smartphone, or game console computer.

* * * * *